United States Patent
Aher et al.

(10) Patent No.: US 11,877,020 B2
(45) Date of Patent: *Jan. 16, 2024

(54) SYSTEMS AND METHODS FOR ASSOCIATING PROGRAM ACTORS WITH PROGRAM GENRES

(71) Applicant: Rovi Guides, Inc., San Jose, CA (US)

(72) Inventors: Ankur Anil Aher, Maharashtra (IN); Aman Puniyani, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,218

(22) Filed: Mar. 16, 2023

(65) Prior Publication Data

US 2023/0239521 A1 Jul. 27, 2023

Related U.S. Application Data

(63) Continuation of application No. 16/916,418, filed on Jun. 30, 2020, now Pat. No. 11,665,383, which is a continuation of application No. 16/216,149, filed on Dec. 11, 2018, now Pat. No. 10,735,786.

(51) Int. Cl.
| | |
|---|---|
| *H04N 21/235* | (2011.01) |
| *G06F 16/78* | (2019.01) |
| *H04N 21/231* | (2011.01) |
| *H04N 21/25* | (2011.01) |
| *H04N 21/462* | (2011.01) |
| *H04N 21/472* | (2011.01) |
| *G06F 16/738* | (2019.01) |
| *G06F 16/735* | (2019.01) |
| *H04N 21/234* | (2011.01) |
| *H04N 21/482* | (2011.01) |

(52) U.S. Cl.
CPC ....... *H04N 21/2353* (2013.01); *G06F 16/735* (2019.01); *G06F 16/738* (2019.01); *G06F 16/7867* (2019.01); *H04N 21/23109* (2013.01); *H04N 21/23418* (2013.01); *H04N 21/251* (2013.01); *H04N 21/462* (2013.01); *H04N 21/47202* (2013.01); *H04N 21/4826* (2013.01)

(58) Field of Classification Search
CPC ......... H04N 21/2353; H04N 21/23109; H04N 21/23418; H04N 21/251; H04N 21/462; H04N 21/47202; H04N 21/4826; G06F 16/735; G06F 16/738; G06F 16/7867
See application file for complete search history.

(56) References Cited

U.S. PATENT DOCUMENTS

| | | |
|---|---|---|
| 10,187,704 B1 | 1/2019 | Sen et al. |
| 2007/0067724 A1 | 3/2007 | Takahashi et al. |
| 2013/0086498 A1* | 4/2013 | Eskander .............. G06F 3/0481 715/765 |
| 2014/0052696 A1 | 2/2014 | Soroushian |

(Continued)

*Primary Examiner* — Adil Ocak
(74) *Attorney, Agent, or Firm* — HALEY GUILIANO LLP

(57) ABSTRACT

Methods and systems for calculating, storing, and allowing electronic searches for metadata associated with media titles. The metadata includes scores specific to each actor and each genre of a media title, where the scores indicate the degree to which an actor's performance in that title corresponds to a particular genre. Electronic searches for particular actors' performance in a specific genre thus return more accurate results that more correctly reflect how well the actors' performances reflect that genre.

20 Claims, 8 Drawing Sheets

500 — For actor and each genre, generate score corresponding to degree to which the actor contributed to genre 510 — Store scores in electronically searchable form — each score associated with actor and one genre

(56) References Cited

U.S. PATENT DOCUMENTS

| | | |
|---|---|---|
| 2014/0089017 A1 | 3/2014 | Klappert et al. |
| 2015/0286644 A1 | 10/2015 | Turner et al. |
| 2019/0007414 A1* | 1/2019 | Trim .................... H04L 63/102 |
| 2019/0388006 A1 | 12/2019 | Harris et al. |

* cited by examiner

"Show me action movies of Chadwick Boseman"

Results:
- Black Panther
- Avengers: Infinity War
- Gods of Egypt
- Captain America: Civil War
- The Express
- 42
- .
- .
- .

Scores:
- Action{90}, Drama{80}, ...
- Action{85}, Comedy{25}, ...
- Action{65}, Drama{65}, ...
- Action{60}, Thriller{75}, Drama{40}, ...
- Action{40}, Drama{85}, ...
- Action{40}, Drama{90}, ...
- .
- .
- .

500

For actor and each genre, generate score corresponding to degree to which the actor contributed to genre

510

Store scores in electronically searchable form – each score associated with actor and one genre

Determine portions of content corresponding to genre – collective duration = first amount of time

610

Determine second amount of time actor appears in determined portions of content

620

Determine score according to proportion of first amount of time that is the second amount of time

FIG. 6

SYSTEMS AND METHODS FOR ASSOCIATING PROGRAM ACTORS WITH PROGRAM GENRES

CROSS-REFERENCE TO RELATED APPLICATIONS

This application is a continuation of U.S. patent application Ser. No. 16/916,418, filed Jun. 30, 2020, which is a continuation of U.S. patent application Ser. No. 16/216,149, filed Dec. 11, 2018, now U.S. Pat. No. 10,735,786. The disclosure of which are hereby incorporated by reference herein in their entireties.

BACKGROUND

This disclosure relates generally to electronic searches, and more specifically to associating program actors with program genres.

SUMMARY

Conventional electronic searches for media titles often return results that are inaccurate and misleading. Electronic searches for movies of a particular genre and having a particular actor often return a number of spurious results. For example, such searches typically return undesirable results such as movies of that genre but having that particular actor only in a cameo role, and movies in which the actor does not participate in any scenes of that genre.

Such electronic searches typically rely on metadata that lacks sufficient granularity to produce accurate results. Relevant metadata for media titles typically includes cast information, i.e. the actors and actresses credited as appearing in the title, and genre information. This genre information in turn includes relevant genres and a score for each genre, where the score quantifies the dominance of that genre in the overall title. However, the cast metadata and genre metadata are independent of each other. No metadata relates the cast to the genre. That is, the metadata for each genre does not describe how much any actor contributes to, or is involved in, that genre—it only shows the contribution of that overall genre to the title, and does not show any individual actor's contribution to that genre. Similarly, the cast metadata does not describe the amount by which cast members individually contribute to a genre. Thus, for instance, all that an electronic search may determine about a particular movie is which genres it falls under, and who acted in it. Searches cannot determine which actors are involved in which genres, as no metadata exists to inform such a query.

Accordingly, to overcome the deficiencies that exist when conducting electronic searches for media titles, systems and methods are described herein for a computer-based process that generates metadata which ties each actor to the genres he or she is involved in. More specifically, this metadata includes the genres each actor participates in, and the degree to which they participate in each genre. Generated metadata includes, for each actor, the genres they are involved in and a score for each genre. These scores indicate the degree or amount that actor participates in that genre. Thus, metadata for a particular media title includes information describing the amount each actor contributes to or participates in each genre. Electronic searches can thus more accurately determine an actor's relation or contribution to a particular genre in various media titles, resulting in more accurate search results.

In more detail, a computer-based system generates a metadata score specific to a particular actor and a particular genre. A media title will thus have associated metadata containing a score for every actor and every genre that actor participates in. Each score thus corresponds to one actor and one genre, and is determined according to the degree to which that actor contributes to that genre. The scores are stored as electronically searchable metadata, where each score is associated with its actor and genre. Electronic searches can thus search according to this more granular metadata, to retrieve results that more accurately reflect an actor's contribution to a particular genre within a given media title, rather than just reflecting the actor's presence in a media title of a particular genre.

Described herein are various ways of calculating metadata scores. One method involves the percentage of scenes of a genre that an actor appears in. More specifically, the scenes of a media title that correspond to a genre are identified. The total duration of these scenes is determined, as is the total amount of time the actor appears in these scenes. These two quantities are divided to determine the percentage or proportion of time the actor appears in these scenes, and this quantity is set equal to the score for that actor and that genre.

Another method involves the number of words spoken during scenes of a specific genre. As with the previous method, the scenes of a media title that correspond to a genre are identified. The total number of words the actor utters during these scenes is counted, and this total is converted to a numerical score, with higher totals corresponding to greater scores.

A further method involves the amount of time an actor appears in scenes of high audio volume. Such scenes are identified, and the score is set equal to the percentage or proportion of time the actor appears in these scenes. This score may, for example, correspond to genres typically associated with high audible volume, such as the action or thriller genres.

Various other factors may also contribute to these scores. In particular, the score may be increased or decreased, i.e. incremented or decremented by a predetermined amount, in response to certain occurrences. For instance, a score may be adjusted by some amount if it is determined that the actor won an award for his or her performance in the media title. If this award is a positive award such as a Best Actor/Actress award, the score is increased. Conversely, if the award is a negative award such as a Worst Actor/Actress award, the score may be decreased.

Reviews may also contribute to a score, with negative reviews decreasing the score and positive reviews increasing it. Electronically searchable reviews may be retrieved and parsed to detect predetermined keywords, and the presence of these keywords may be used to increment or decrement the score. The predetermined keywords may be divided into positive and negative keywords, with positive keywords adding to the score and negative keywords decreasing it. The keywords may be further categorized by genre. For instance, phrases such as "vicious fighting technique" may be categorized as positive keywords for an action genre. On the other hand, terms such as "unconvincing" may be categorized as negative for a drama genre, and phrases such as "bad acting" and "cringeworthy performance" may be categorized as negative for all genres. Each detected keyword may have a value associated with it, and these values may be used to increment or decrement a score. Reviews may be any type of review, such as reviews authored by well-known critics, established sources, social media reviews, or any other electronically retrievable source.

The above described metadata improves the accuracy of electronic searches for media titles. Metadata scores may be generated and stored in electronically searchable form, as an added component to the conventional metadata associated with a media title. Electronic searches thus retrieve the stored metadata scores. Retrieved results can then be ordered by score, and thus presented as a list of media titles ordered according to the degree to which actors contributed to genres specific media titles. In this manner, electronic searches for media titles with a selected genre and actor would thus return results ranked according to the degree that actor participated in that particular genre, rather than just titles having that actor and overall genre.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which:

FIG. 5 is a flowchart illustrating process steps of metadata generation according to embodiments of the disclosure;

FIGS. 6-10 are flowcharts illustrating further details of process steps for generating metadata scores.

DETAILED DESCRIPTION

In one embodiment, the disclosure relates to a system that calculates, stores, and allows electronic searches for metadata associated with media titles. This metadata is of a particular format, having scores relating the performance of a particular actor to each specific genre in a media title.

Conventional metadata describing media titles only has genre and actor/cast information that describes the degree to which each title correlates to a genre. For example:
Title: Black Panther
Genres: Action{90}< >Thriller{70}< >Comedy {30}< > . . .
Cast: Chadwick Boseman < >Letitia Wright < >Martin Freeman < > . . .

As can be seen, each genre relates only to the title as a whole. That is, each genre score describes only the contribution of the title as a whole to that genre. Genre scores provide no information as to which actor contributes to which genres. In the example above, it cannot be determined whether Chadwick Boseman's performance primarily fell under the action genre, the thriller genre, or the comedy genre. The same is true of each other actor. Martin Freeman may have played primarily a comedic role, for instance, but this cannot be determined from the above.

This leads electronic searches to return poor and inaccurate results. Searches for "action movies of Martin Freeman", for example, would rank results such as this title highly, as it has Martin Freeman in it and has a high action score (90), even though Martin Freeman's performance in this title would likely be characterized as largely comedic (i.e., acting primarily in a comic relief role). Such a search result would be deemed by many as being misleading or simply inaccurate.

Figures 1A, 1B:
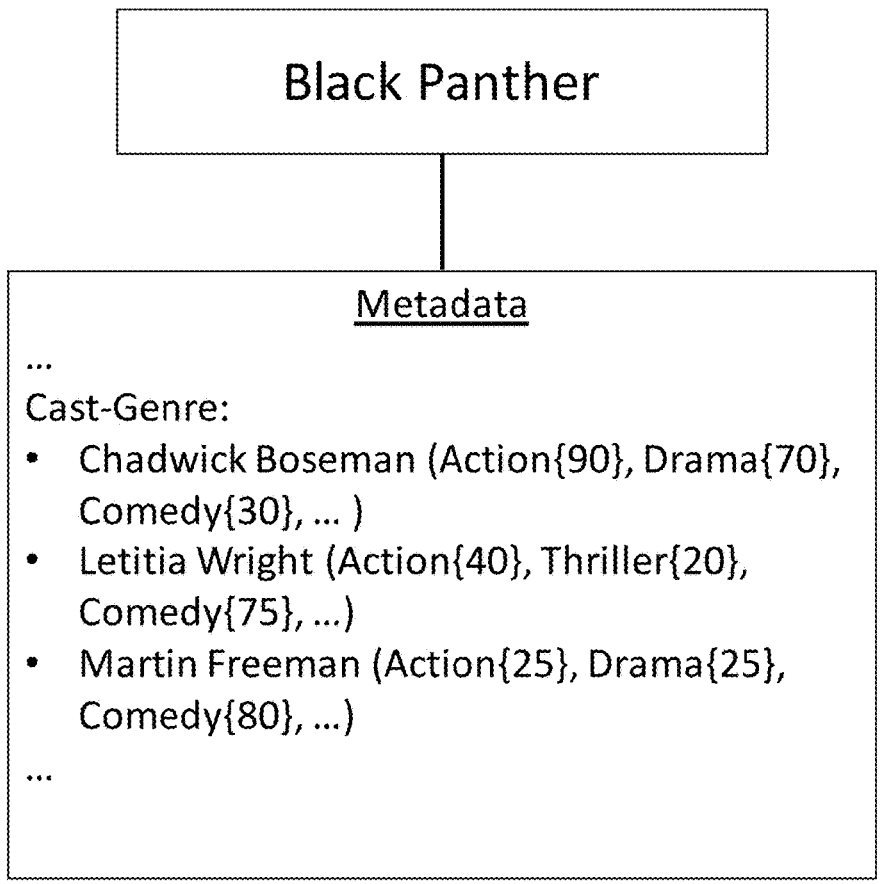
FIG. 1A illustrates exemplary search results ordered according to associated metadata scores of the present disclosure.
FIG. 1B illustrates exemplary metadata for media titles according to an embodiment of the present disclosure.

In contrast, embodiments of the disclosure describe generation of electronically stored metadata that connects each actor's performance to specific genres, thus resulting in more accurate searches for media titles. FIG. 1A is an example of such stored metadata for one particular title. Instead of being structured as above, metadata of this example is structured as follows:
Title: Black Panther
Cast-Genre: Chadwick Boseman (Action{90}< > Drama{70}< >Comedy{30}, . . . ) Letitia Wright (Action{40}< >Thriller{20}< >Comedy{75}, . . . ) Martin Freeman (Action {25}< >Drama {25}< >Comedy {40, . . . )

Here, the metadata contains a score specific to each actor's contribution to each genre. For example, Chadwick Boseman merits a score of 90 for Action, indicating that his performance was very action-oriented, i.e. he contributed significantly to the action in this movie title. Conversely, he has a score of 30 for Comedy, indicating that his performance was not very comedic, i.e. his character did not contribute significantly to the comedic scenes of the movie.

A score for each actor-genre pair generates more accurate search results. FIG. 1B illustrates exemplary search results utilizing metadata structured according to the disclosure. When "show me action movies of Chadwick Boseman" is entered as a search query, results are returned as shown on the left-hand column of FIG. 1B, while the corresponding metadata for each result is shown on the right-hand column. The search results returned are ordered according to the Action score assigned to Chadwick Boseman for each title. Because Black Panther has the highest Action score for Chadwick Boseman, this title is returned as the first result. Successive results are arranged in decreasing order of Action scores specific to Chadwick Boseman. As can be seen, such results track Chadwick Boseman's action performances well, with each later result being a title in which his performance is less and less action-oriented. Accordingly, embodiments of the disclosure provide more granular metadata that more accurately characterizes the performance of each actor in a media title, thus resulting in more accurate electronic searches.

Figure 2:
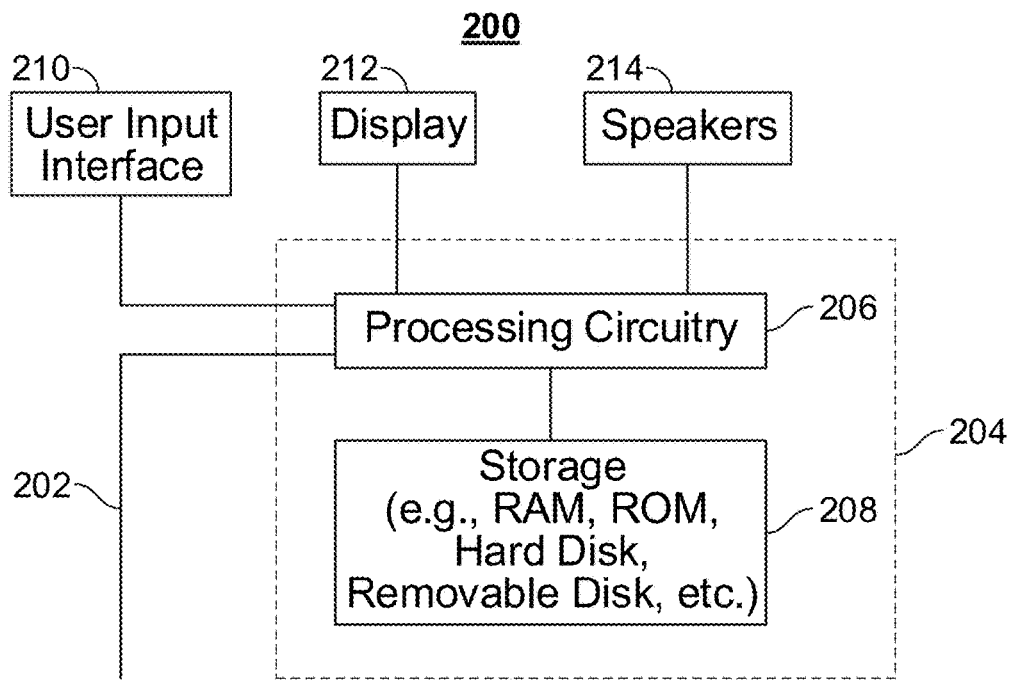
FIG. 2 is a generalized embodiment of an illustrative user equipment device constructed for use according to embodiments of the disclosure.

Metadata of the disclosure may be accessed and analyzed by any hardware capable of conducting a search for electronically stored content. FIG. 2 shows a generalized embodiment of an illustrative electronic computing device 200 capable of performing such searches and displaying corresponding results. For instance, device 200 may be a desktop, laptop, or tablet computer, Internet-enabled television, or may be a cellular phone with similar capabilities.

Computing device 200 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths, but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a media guidance application stored in memory (i.e., storage 208). Specifically, control circuitry 204 may be instructed by the media guidance application to perform the functions discussed above and below. For example, the media guidance application may provide instructions to control circuitry 204 to generate the media guidance displays. In some implementations, any action performed by control circuitry 204 may be based on instructions received from the media guidance application.

In client-server based embodiments, control circuitry 204 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The circuitry described herein, including for example, the tuning, video generating, encoding, decoding, encrypting, decrypting, scaler, and analog/digital circuitry, may be implemented using software running on one or more general purpose or specialized processors. If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of user equipment device 200. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, display 212 may be HDTV-capable. In some embodiments, display 212 may be a 3D display, and the interactive media guidance application and any suitable content may be displayed in 3D.

A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214.

Figure 3:
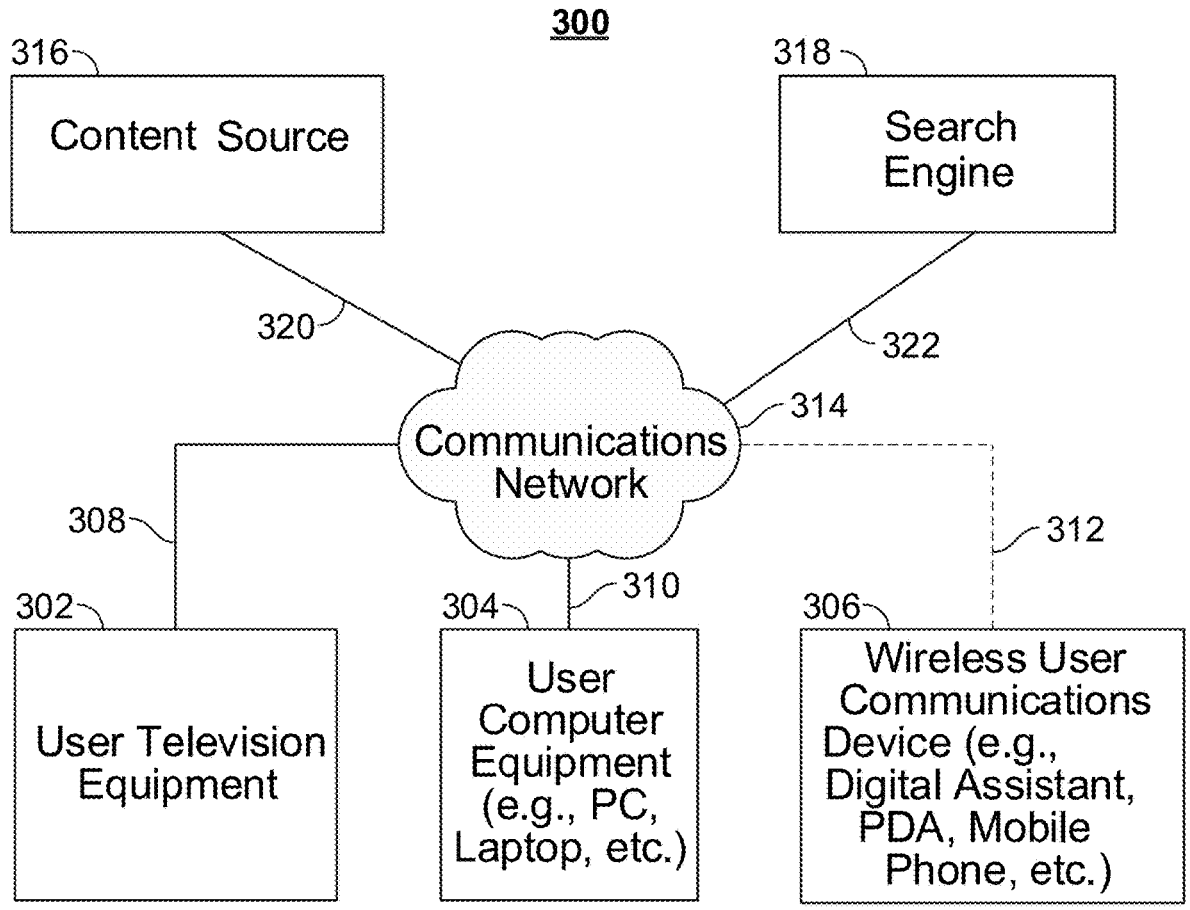
FIG. 3 is a block diagram representation of an exemplary electronic search and communication system according to embodiments of the disclosure.

Device 200 of FIG. 2 can be implemented in system 300 of FIG. 3 as user television equipment 302, user computer equipment 304, wireless user communications device 306, or any other type of user equipment suitable for conducting an electronic search and displaying results thereof. User equipment devices may be part of a network of devices. Various network configurations of devices may be implemented and are discussed in more detail below.

In system 300, there is typically more than one of each type of user equipment device but only one of each is shown in FIG. 3 to avoid overcomplicating the drawing. In addition, each user may utilize more than one type of user equipment device and also more than one of each type of user equipment device.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths, but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 also includes content source 316, and search engine 318. The content source 316 represents any computer-accessible source of content, such as a storage for the movies and metadata of FIG. 1. The recommendation building computer 318 and recommendation engine computer 324 are in communication with each other, and with any of the devices 302, 304 and 306, through communications network 314.

Figure 4:
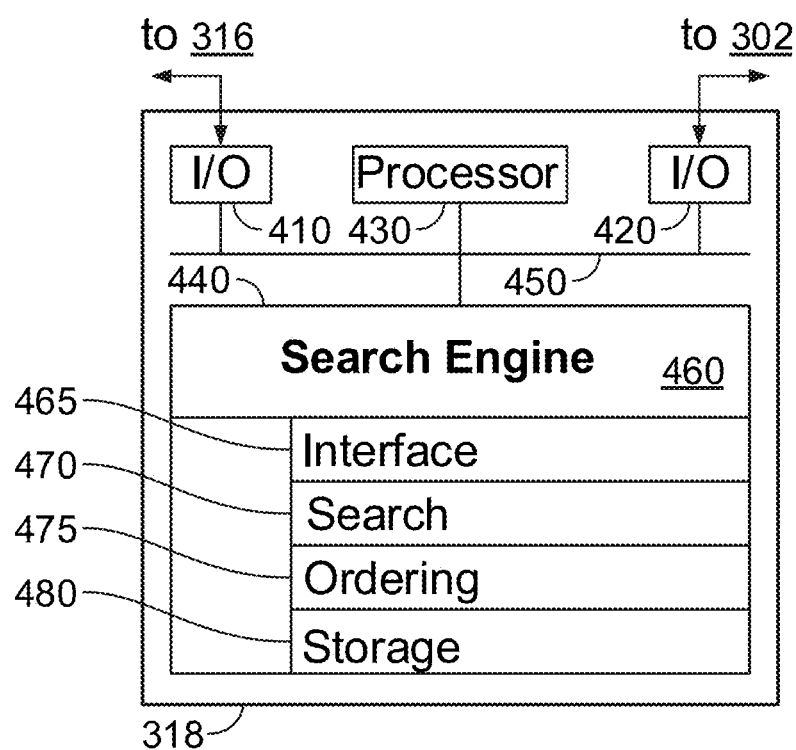
FIG. 4 is a generalized embodiment of electronic computers constructed to implement metadata scoring and electronic search operations of embodiments of the disclosure.

FIG. 4 illustrates further details of search engine 318. Search engine 318 is an electronic computer that has input/output (I/O) modules 410, 420 for transferring data to and from the search engine 318. The search engine 318 also has a processor 430 and memory 440. The I/O modules 410, 420, processor 430, and memory 440 are each connected to, and communicate with each other through, a bus 450. As with device 200, the processor 430 and memory 440 may collectively be considered as control circuitry. In some embodiments, computer 318 may be in electronic communication with content source 316 and device 200 through I/O modules 410 and 420, respectively.

The processor 430 executes programs stored in memory 440, including a search engine program 460. The search engine program 460 has a number of modules, including an interface module 465, a search module 470, an ordering module 475, and a storage module 480. The interface module 465 provides an interface for exchange of data with devices 200, while the search module 470 conducts searches of electronically stored information and returns relevant results. The ordering module 475 orders the results for transmission to devices 200 and presentation to the user. In embodiments of the disclosure, ordering module 475 orders search results according to the metadata scores described herein. The storage module 480 stores retrieved results for ordering by the ordering module 475, and retrieval and transmission to devices 200.

As shown in FIG. 4, the search engine 318 is a stand-alone computer in communication with the devices 302, 304, 306 over communication network 314. However, one of ordinary skill in the art will recognize that the methods and processes of the disclosure can be carried out on any computational devices suitable for executing the search engine 318 programs. For example, the computer 318 may be a server located remote from devices 200. Alternatively, the search engine 318 programs may be resident on a device 200. Embodiments of the disclosure contemplate any number or configuration of digital computers for storing and executing the search engine 318 programs and their associated data, located on or remote from any device 200.

FIG. 4 illustrates a configuration in which modules and functionality of embodiments of the disclosure reside on computer 318 remote from the device 200. That is, content searching is performed by an application located remote from device 200, such as an application running on cloud servers. In this configuration, computer 318 may be a cloud server or components of one or more cloud servers, or may be one or more other computers located remote from device 200. However, embodiments of the disclosure also encompass configurations in which modules and functionality of computer 318 reside in any location. For instance, any one or more of modules 465-480 may be resident on device 200 or content source 316, or may be distributed across multiple peer or other computing devices.

FIG. 5 is a flowchart illustrating process steps for generating metadata according to the present disclosure. Here, a separate score is generated for each actor and each genre of a particular media asset, or content (Step 500). Each score is associated with a single actor and a single genre, and corresponds to the degree to which that particular actor contributed to that particular genre. In one embodiment, such scores can be generated by content source 316 for its resident content. However, other embodiments of the disclosure contemplate generation and storage of scores at any location.

Once scores are generated specific to each actor and each genre, the scores are stored in electronically searchable form, so that each score is associated with its particular actor and genre (Step 510). For example, when content source 316 is a server of a content provider, the content source 316 stores electronically accessible metadata descriptions that contain searchable descriptors of matching multimedia files. These multimedia files may also be stored on content source 316. The storage of searchable metadata by content providers is known, and embodiments of the disclosure contemplate storage in any electronically searchable format. For example, metadata scores of the disclosure may be stored in conventional actor metadata fields along with actor names, or conventional actor metadata fields may be replaced by actor/genre score fields each listing the actor, a genre, and associated score as calculated in Step 500. In this manner, electronic searches conducted by devices such as search engine 460 of server 318 access these actor fields, or actor/genre score fields, and parse/retrieve relevant score data for ranking and display to the user.

The scores of Step 500 may be calculated in any manner so long as they reflect the amount each actor contributes to or participates in a specific genre within a particular media asset. In some embodiments, the scores may be determined according to a combination of quantitative factors and qualitative factors. Here, quantitative factors represent objective measures of the amount of coverage of a genre by an actor in a program or media asset. Qualitative factors, conversely, represent subjective measures of justification done to the genre by the actor in the particular program. Each factor may be assigned a score or integer number, and these scores may be summed to determine the total or overall score of Step 500. Each of these factors may be determined in any manner. Exemplary methods and processes for determining these factors follow, although the disclosure contemplates any other method for determining quantitative and qualitative factors for scores describing the contribution of an actor to a genre in any media.

FIG. 6 is a flowchart illustrating process steps for determining one such quantitative factor. In particular, the process of FIG. 6 determines the percent coverage of an actor in scenes of a particular genre. That is, for scenes predominantly of a particular genre, this factor determines the amount of time that the actor is in such scenes. First, the portions of content corresponding to a particular genre are determined, where these portions have a collective duration equal to some first amount of time (Step 600). For example, the scenes of a movie that are characterized as predominantly Action scenes are identified, where these scenes collectively have a total duration measured in some amount of time, e.g., seconds.

Next, a second amount of time that the actor appears in these identified scenes is determined (Step 610). Appearance in identified scenes can be determined manually such as by operators who view scenes and record the amount of time actors appear in each, or automatically such as by known facial recognition software. This software may be implemented on content source 316, to determine the amount of time each actor appears in each scene. Scores are then determined according to the proportion of the first amount of time that is the second amount of time (Step 620). That is, the score is the percentage of time the actor appears in the identified scenes, and may be determined as the second amount of time divided by the first amount of time, converted to a percentage if desired.

Figure 7:
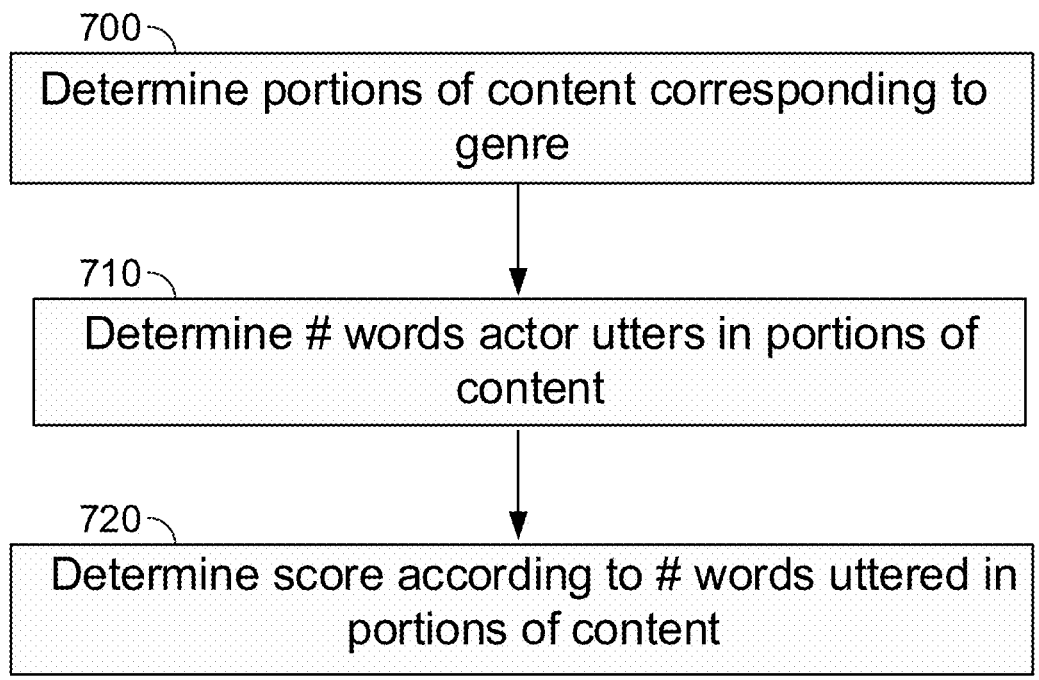

FIG. 7 illustrates process steps for determining another quantitative factor. In particular, this factor expresses the number of words spoken by an actor in scenes of a particular genre. Higher scores for this factor reflect more dialog, and thus greater participation, in scenes of that genre. Here, the portions of content corresponding to a particular genre are determined (Step 700), similar to Step 600 above. The number of words an actor utters in those portions of content are then determined (Step 710), such as by manual count or by known voice recognition software, perhaps located on content source 316. The score for this factor is then determined according to this determined number of words (Step 720). This score may be determined in any manner, such as by a table of values relating spoken word count to factor scores (e.g., 0-100 words=10, 101-500 words=20, 501-1000 words=30, etc.), an equation or function relating word count to score, or the like. Any method of determining a numerical score of any desired range, from a count of words, is contemplated.

Figure 8:
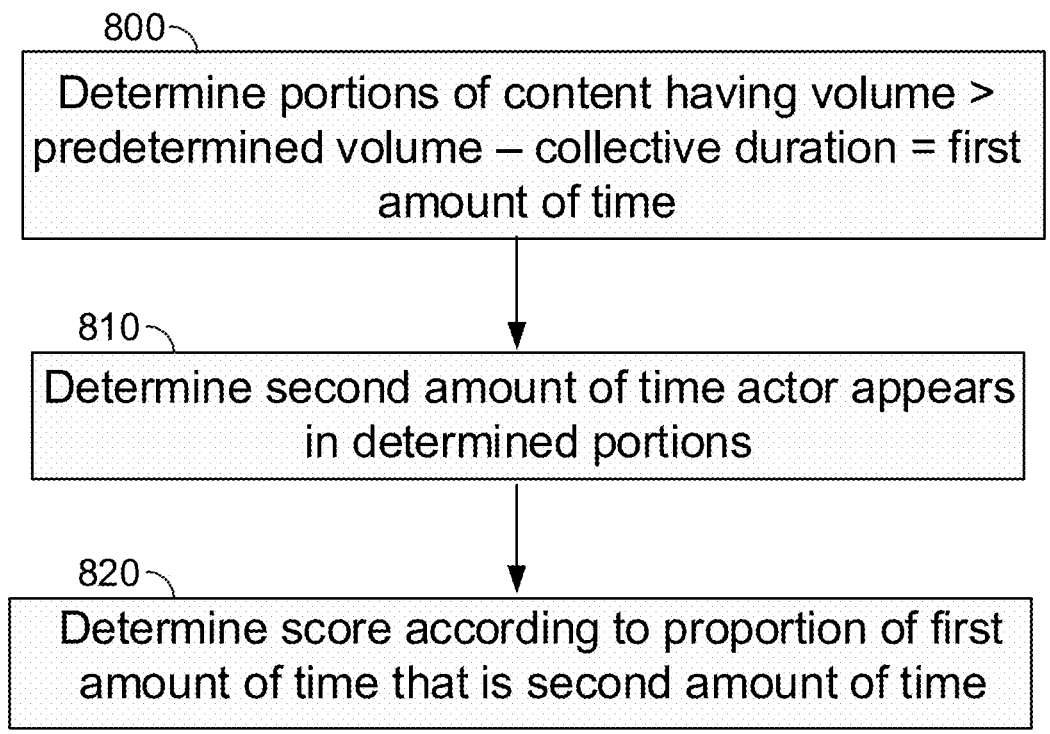

FIG. 8 illustrates process steps for determining a further quantitative factor. The quantitative factor of FIG. 8 relates to the amount of time an actor appears in scenes of high auditory volume, and may thus be useful in characterizing scenes corresponding to genres such as Action or Thriller. First, portions of content having volume greater than a predetermined volume are determined (Step 800). These scenes collectively have a duration measured as a first amount of time. Step 800 may employ any measure of volume, such as average volume across the entire scene, peak volume in a scene, the amount of time volume exceeds some predetermined amount, or the like. Any measure predictive of a "loud" genre may be used.

Next, a second amount of time is determined, where this second amount of time is the amount of time the actor in question appears in the determined portions of content (Step 810). As in Step 610 above, this second amount of time may be determined in any manner, such as manually or by facial recognition software. The score for this factor is then determined as the proportion of the first amount of time that is the second amount of time (Step 820). That is, the score is the percentage of time the actor appears in the identified scenes, and may be determined as the second amount of time divided by the first amount of time, converted to a percentage if desired.

Figure 9:
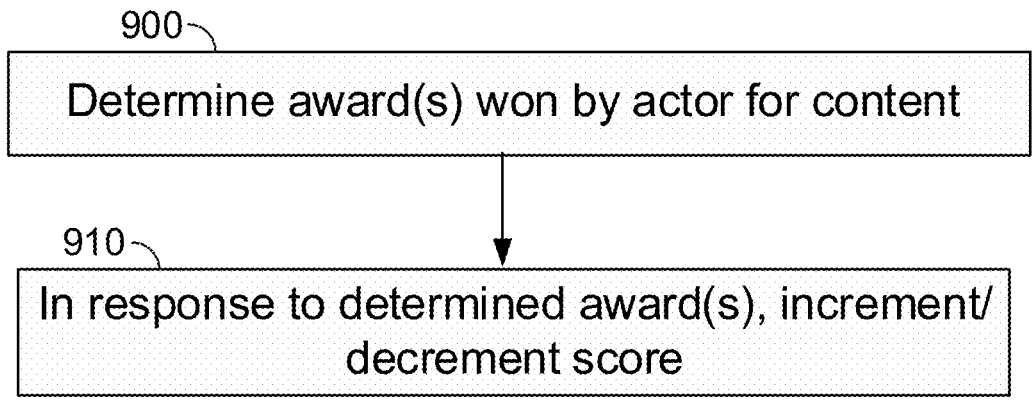

Qualitative factors may be employed in score calculation, as well. Unlike the above quantitative factors, qualitative factors are subjective measures of the degree to which an actor's performance is deemed to fall under a particular genre. Any such measures are contemplated. FIG. 9 is a flowchart illustrating process steps for determining one qualitative factor. Here, the score for this qualitative factor is increased or decreased according to awards earned by the actor for that particular content. In particular, the content source 316, or another computing device carrying out the above scoring processes, determines awards won by an actor for content (Step 900). The existence of awards may be determined in any manner, such as by electronic searches for known awards, searches of web pages known to list awards (e.g., the Wikipedia® pages of particular movies or actors), searches for news articles containing the actor's name, the title of the content and an award name, or the like.

The awards may be positive or negative awards. For example, many well-known awards are positive and indicate good performances, or performances that match their intended genre well. Examples of such awards include the Critic's Choice award, Emmy or Oscar awards for Best Actor/Actress, and the like. Conversely, other awards are negative awards that indicate bad performances or performances ill-suited to that particular genre. Examples of such awards include Golden Raspberry awards for Worst Actor/Actress and Worst Film, and the like.

Accordingly, this factor is incremented or decremented according to the number and type of awards detected (Step 910), with positive awards resulting in score increments and negative awards resulting in score decrements. Scoring may be performed in any manner. For example, lists of positive and negative awards may be kept, and the score for this factor may be incremented/decremented by a predetermined amount for each positive/negative award earned which appears on the list, to some maximum/minimum value. Increment/decrement values may be constant or may vary by award, with certain awards such as Best Actor or Best Film being considered more significant, or indicative of a better performance, and thus worth more.

Figure 10:
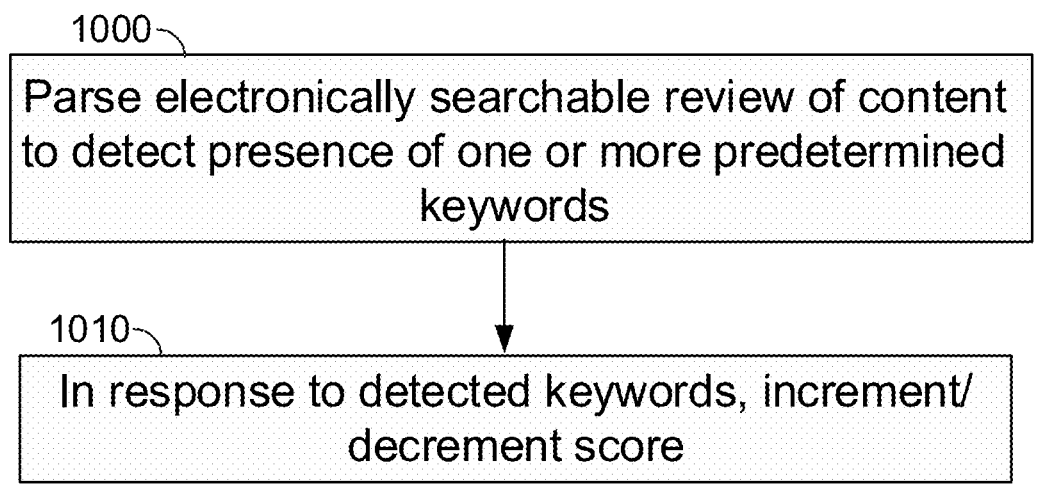

FIG. 10 is a flowchart illustrating process steps for determining another qualitative factor. In this factor, scores are increased or decreased according to electronically accessible reviews by known critics, with positive reviews resulting in score increases and negative reviews resulting in score decreases. Lists of genre-specific positive and negative keywords are maintained at, for example, a storage in content source 316. Reviews are electronically searched and retrieved according to, for instance, critic name or organization, whereupon these reviews are parsed to determine the presence of any keywords in the stored lists (Step 1000). The score for this factor is then incremented or decremented in response to any detected keywords (Step 1010).

The reviews used for scoring in the process of FIG. 10 may be any electronically searchable reviews. Many such reviewers are well known, and their reviews appear on known Internet pages, e.g., well known movie critics who work for established news publications. Others are located on known social media pages which can be readily searched and retrieved.

The maintained keyword lists are lists of genres and their keywords, i.e. genre-specific keywords. When a particular actor and genre are scored, reviews containing that particular content title and actor are searched, retrieved, and parsed. For each successive genre, keywords for that genre are compared against any parsed keywords, with matches resulting in score increments/decrements. For example, when scoring the Action genre of Chadwick Boseman in Black Panther, exemplary positive Action keywords may be words or phrases such as "vicious hand to hand . . . ", "riveting", or the like. Each matched word or phrase in a review increments the score by a predetermined amount. Conversely, exemplary negative Action keywords may be words or phrases such as "bad acting", "unconvincing", "stilted action", etc., and each matching phrase in reviews would decrement the score by a predetermined amount.

Scores for each factor are then combined, to produce a single overall score for each actor-genre pair. Both the individual scores for each factor, and the overall score, may be determined and/or combined in any manner. For example, each factor score may be scaled so that the combined total sums to a maximum of 100. Alternatively, certain factors may be deemed more important, and thus given a higher weight, so that the maximum sum total remains 100 but certain factors contribute to the sum to a greater degree.

Figure 11:
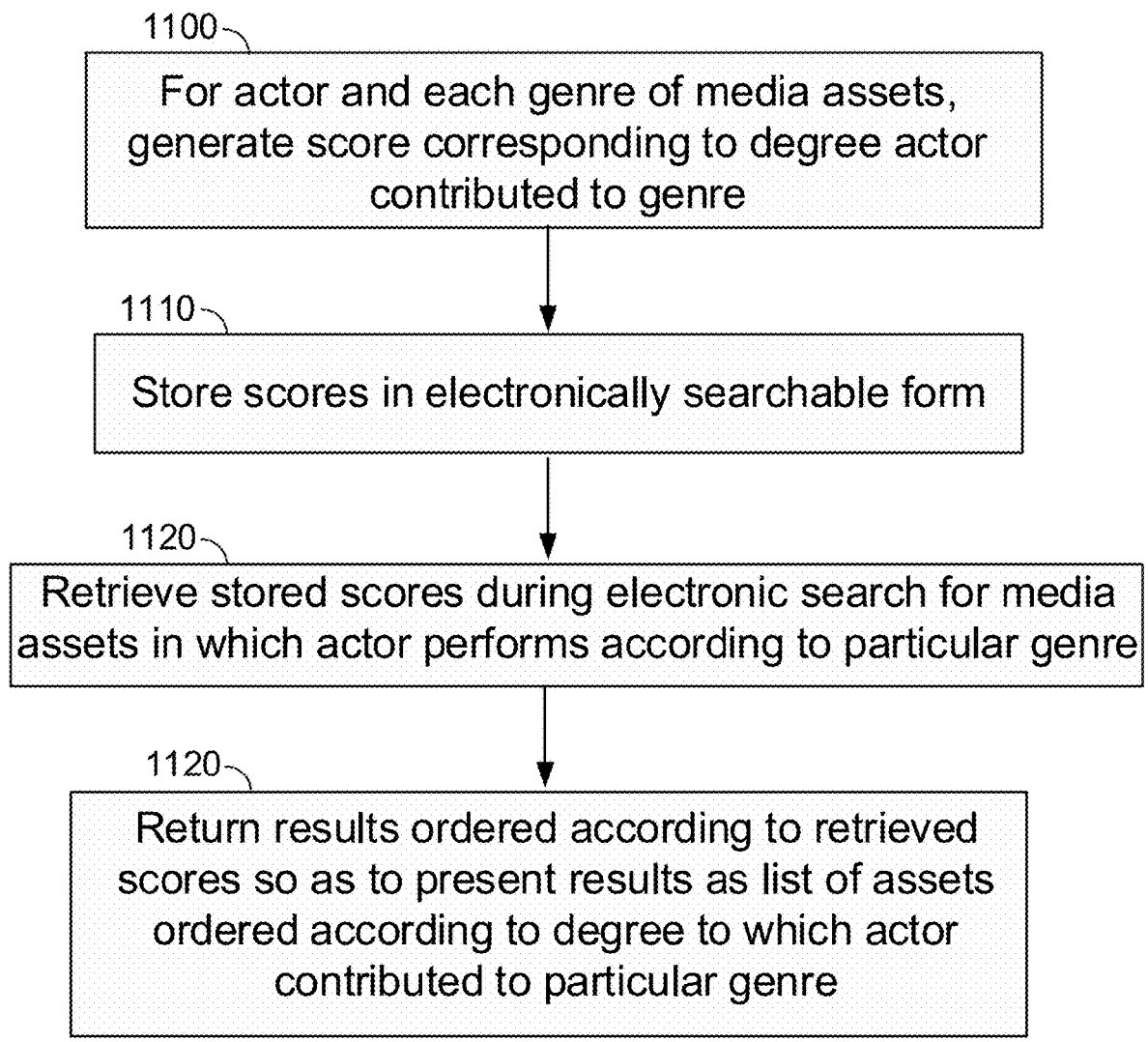
FIG. 11 is a flowchart illustrating process steps of electronic searches on metadata generated according to embodiments of the disclosure.

In operation, the scores for each factor are summed or otherwise accumulated to determine an overall score for each actor-genre pair in a media title. These scores are stored as electronically searchable metadata in, e.g., content source 316, as a data structure that can be represented as shown in FIG. 1B. Electronic searches for particular actors and genres can thus retrieve results that more accurately reflect the amount that particular actor's performance in various media titles falls under that particular genre. FIG. 11 is a flowchart illustrating these process steps in further detail.

As shown in FIG. 11, metadata scores are generated for each actor and each genre of a particular media asset, where each score corresponds to the degree to which a particular actor contributed to a particular genre in that media asset (Step 1100). Metadata scores are generated as above. The generated scores are then stored in electronically searchable form (Step 1110), such as on content source 316 available to exchange data over communications network 314.

During an electronic search for, e.g., media assets having a particular actor performing according to a particular genre, the stored scores are retrieved (Step 1120), and corresponding search results are ordered according to the retrieved scores. Results are thus presented as a ranked list of media assets ordered according to the degree to which that particular actor contributed to that particular genre (Step 1130).

Metadata generation may be carried out in any known manner. Metadata generation instructions, search engine instructions, and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory (e.g., storages 208, 480) or storage devices such as a hard disk, floppy disk, USB drive, DVD, CD, media cards, register memory, processor caches, Random Access Memory ("RAM"), etc. Additionally, electronic searches carried out in accordance with embodiments of the disclosure may be performed by any computing device or devices, including device 200, content source 316, computer 318, or the like. Also, electronic searches carried out in accordance with embodiments of the disclosure may be carried out by the same devices that generate metadata of the disclosure, or by different devices.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, metadata scores may be determined according to any number and combination of quantitative and qualitative factors, summed or totaled in any manner. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
   receiving a search query that identifies an actor and a genre;
   accessing, in a database, a plurality of media content items, wherein metadata of each media content item of the plurality of media content items comprises the name of the actor;
   for each respective media content item of the plurality of media content items:
   accessing a respective genre contribution score that measures the actor's degree of contribution to the genre within each media content item;
   generating for display identifiers of the plurality of media content items ranked according to their respective genre contribution score.

2. The method of claim 1, wherein the genre contribution score that measures the actor's degree of contribution to the genre within each media content item corresponds to the contribution of the actor to at least one scene of a plurality of scenes of the media content item, and wherein the at least one scene corresponds to a particular genre.

3. The method of claim 2, wherein determining the genre contribution score further comprises:
- determining the at least one scene of the media content item corresponding to the particular genre has a duration that is a first amount of time;
- determining a second amount of time that the actor appears in the determined scene;
- determining the genre contribution score at least in part according to a proportion of the first amount of time to the second amount of time.

4. The method of claim 2, wherein determining the contribution score further comprises:
- determining a number of words that the actor utters in the at least one scene; and
- determining the contribution score at least in part according to the number of words.

5. The method of claim 2, wherein determining the contribution score further comprises:
- determining that the at least one scene of the media content item is associated with a volume greater than a predetermined volume.

6. The method of claim 2, wherein the particular genre is one of action, comedy, drama and thriller.

7. The method of claim 2, wherein determining the contribution score further comprises:
- determining an award won by the actor for the media content item; and
- in response to the determined award, incrementing the contribution score.

8. The method of claim 2, wherein determining the contribution score further comprises:
- parsing an electronically searchable review of the media content item to detect the presence of one or more predetermined keywords; and
  - in response to the detected presence of the one or more predetermined keywords, incrementing the contribution score.

9. The method of claim 8, wherein the review is a social media review.

10. The method of claim 2, wherein determining the contribution score further comprises:
- parsing an electronically searchable review of the media content item to detect the presence of one or more predetermined keywords; and
- in response to the detected presence of the one or more predetermined keywords, decrementing the contribution score.

11. A system comprising:
input/output circuitry configured to:
- receive a search query that identifies an actor and a genre;

control circuitry configured to:
- access, in a database, a plurality of media content items, wherein metadata of each media content item of the plurality of media content items comprises the name of the actor;
- for each respective media content item of the plurality of media content items:
  - access a respective genre contribution score that measures the actor's degree of contribution to the genre within each media content item; and wherein the input/output circuitry is further configured to:
- generate for display identifiers of the plurality of media content items ranked according to their respective genre contribution score.

12. The system of claim 11, wherein the genre contribution score that measures the actor's degree of contribution to the genre within each media content item corresponds to the contribution of the actor to at least one scene of a plurality of scenes of the media content item, and wherein the at least one scene corresponds to a particular genre.

13. The system of claim 12, wherein the control circuitry is further configured to determine the genre contribution score by:
- determining the at least one scene of the media content item corresponding to the particular genre has a duration that is a first amount of time;
- determining a second amount of time that the actor appears in the determined scene;
- determining the genre contribution score at least in part according to a proportion of the first amount of time to the second amount of time.

14. The system of claim 12, wherein the control circuitry is further configured to determine the genre contribution score by:
- determining a number of words that the actor utters in the at least one scene; and
- determining the contribution score at least in part according to the number of words.

15. The system of claim 12, wherein the control circuitry is further configured to determine the genre contribution score by:
- determining that the at least one scene of the media content item is associated with a volume greater than a predetermined volume.

16. The system of claim 12, wherein the particular genre is one of action, comedy, drama and thriller.

17. The system of claim 12, wherein the control circuitry is further configured to determine the genre contribution score by:
- determining an award won by the actor for the media content item; and
- in response to the determined award, incrementing the contribution score.

18. The system of claim 12, wherein the control circuitry is further configured to determine the genre contribution score by:
- parsing an electronically searchable review of the media content item to detect the presence of one or more predetermined keywords; and
- in response to the detected presence of the one or more predetermined keywords, incrementing the contribution score.

19. The system of claim 18, wherein the review is a social media review.

20. The system of claim 12, wherein the control circuitry is further configured to determine the genre contribution score by:
- parsing an electronically searchable review of the media content item to detect the presence of one or more predetermined keywords; and
- in response to the detected presence of the one or more predetermined keywords, decrementing the contribution score.

* * * * *